Nov. 9, 1965 D. K. OEY 3,216,745
FLANGE COUPLING AND METHOD FOR ASSEMBLING THE SAME
Filed Feb. 12, 1963 3 Sheets-Sheet 2

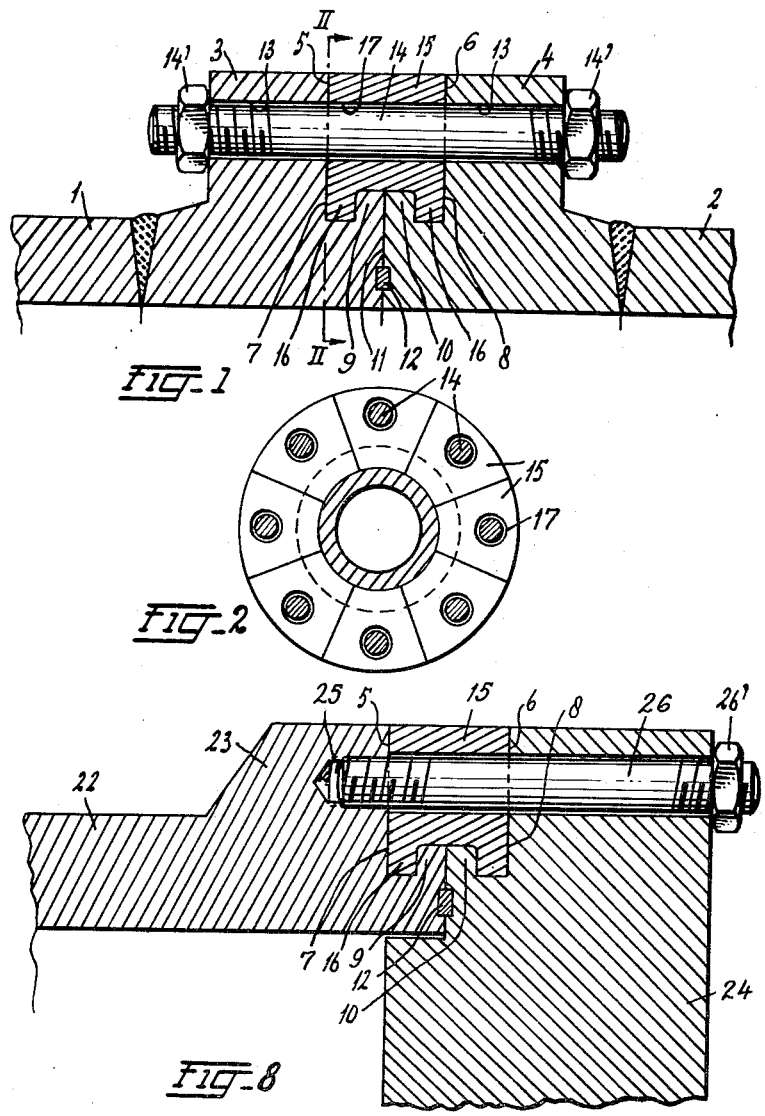

United States Patent Office 3,216,745
Patented Nov. 9, 1965

3,216,745
FLANGE COUPLING AND METHOD FOR ASSEMBLING THE SAME
Djin Kian Oey, Rijswijk, Netherlands, assignor to "Lummus Nederland N.V.," The Hague, Netherlands, a Dutch company
Filed Feb. 12, 1963, Ser. No. 258,063
Claims priority, application Netherlands, Feb. 16, 1962, 274,936
3 Claims.  (Cl. 285—91)

The invention relates to a flange coupling for connecting two adjoining flanged parts of a high-pressure vessel and more especially such a coupling for connecting two sections of a high-pressure pipe or tube or for mounting a cover on a pressure vessel. The invention also relates to a method for assembling such a flange coupling.

In the usual flange couplings of this type, e.g. for connecting two aligned pipes, the closing-off of a pipe or vessel by means of a cover member or the like, the two flanges to be connected have coinciding bolt holes arranged in a circular row and draw bolts passing through said holes for drawing the flanges against one another, while sealing means may be provided between the vessel parts to be connected for obtaining a tight seal. In this case the bolts must be capable to take up the axial forces which occur when the fluid in the pipe or other vessel is under high pressure. These forces cause the flanges of the two vessel parts to be subjected to a bending strain and the bolts to a tensile strain and in the case of high pressure these parts must have corresponding large dimensions to avoid leakage. As a consequence the flange coupling becomes cumbersome and heavy, which in the case of pressure vessels such as reactors, and more especially in the case of heat exchangers may lead to difficulties.

The main object of the invention is to provide a flange coupling of the kind as indicated which avoids these difficulties and can be of a considerably smaller and lighter construction than the known coupling constructions.

It is a further object of the invention to provide such a flange coupling provided with sealing means and capable of withstanding high pressures and the accompanying large axial forces and bending forces without any noticeable deformations in the coupling parts or leakage occurring.

It is another object of the invention to provide a flange coupling for securing a cover on a pressure vessel, in which the cover can be easily mounted and removed.

Another object of the invention is to provide a special method for assembling the parts of the novel flange coupling.

According to the invention, each of the two flanges to be coupled has at its side facing the other flange an annular recess, which is bounded by a side wall extending radially inwardly from the outer circumference of the flange and by a cylindrical bottom wall extending axially inwardly from the end face of the flange, in which the cylindrical bottom wall, which is concentric with the axis of the flange, has an annular groove adjacent the radial side wall of the recess. When the two flanges to be connected are arranged in alignment one against the other the two opposite recesses of the abutting flanges together form an annular circumferential cavity of substantially U-shaped cross-section with the bolt holes of the two flanges opening into this cavity. For connecting the two flanges to one another a split coupling ring is provided, which comprises a number of separate segments and which has a cross-section of similar U-shape as the above-mentioned cavity. The coupling ring sections are arranged in the cavity with the body of the ring sections closely fitting between the radial side walls of the two recesses forming the cavity and with two radially inwardly projecting annular portions of the ring segments fittingly engaging in the two annular grooves of the recesses. The coupling ring is further provided with a number of bolt holes, at least one for each ring section, which holes coincide with the bolt holes in the two flanges and through which the draw bolts pass and thereby hold the ring sections against radially outward movement.

When the flange coupling as above described is subjected to axial forces, the coupling ring segments, engaging with their inwardly projecting portions in the annular grooves of the recesses of the two flanges, are subjected to tensile strain and to shear. The bolts, however, need not take up the operational load when the pipe or vessel is put under high pressure and thus can be of a considerably smaller diameter than the draw bolts of the known flange coupling constructions, while at the same time the flanges can be considerably smaller. This has the advantage of less weight and less space required for the coupling and also smaller cost. The coupling ring segments engage the grooves of the flanges at a smaller radial distance from the axis of the vessel than the radius of the bolt circle, whereby the flanges are subjected to smaller bending forces compared to the conventional bolt flange couplings. The coupling ring segments together completely fill up the cavity formed by the two recesses of the flanges and thus form together with the flanges a compact block.

According to an embodiment of the flange coupling of the invention for securing a cover on a pressure vessel, the flange secured against the flange of the vessel by means of the above described coupling ring and bolts, may consist of a separate backing ring, which projects radially inwardly past the inner wall of the vessel opening. The cover may engage and be secured by bolts or other suitable means against the axially inwardly facing side of the projecting annular portion of the backing ring and an annular gasket means may be arranged between this backing ring portion and the cover. In this case the sealing means or gasket is not arranged between the two flanges held together by the coupling ring segments, but between the cover and the backing ring and is compressed between these parts by the pressure in the vessel acting on the cover.

According to another embodiment of the invention, in which the compressible annular sealing means is arranged between the two opposing faces of the flanges inwardly of the cavity, the coupling ring segments, and especially the axial distance between the two inwardly projecting portions thereof engaging in the grooves, are so dimensioned that they hold the two flanges clamped together in a position, in which the sealing means is held sufficiently axially compressed for obtaining the required tight seal against the high pressure in the vessel. Once the coupling ring segments are mounted, the bolts thus need not help in holding the sealing means in the compressed condition.

In the flange coupling of the last mentioned embodiment the coupling ring segments can obviously not be pushed home with their projecting portions engaging in the grooves of the flanges as long as the deformable sealing means or gasket ring has not been compressed to its sealing condition. The invention also provides a method for overcoming this difficulty and for assembling the flange coupling in a simple manner. According to this method the two flanges are first connected by means of the draw bolts without, however, the coupling ring segments being placed in the annular cavity between the flanges, and the bolts are drawn sufficiently tight for the sealing means between the flanges to be axially compressed to the required rate for ensuring a tight seal against the working pressure to be expected in the vessel. Thereupon as many adjacent bolts as there are bolt holes in a coupling ring segment are removed and such a ring segment is inserted through the opening so obtained into the cavity to a position, in which it engages the grooves of the flange recesses and in which its bolt hole or each of its bolt holes is in alignment with the flange bolt holes of a removed bolt. Then each of the removed bolts is again inserted and tightened, whereby the right segment is mounted an locked in place. Thereafter the same procedure is repeated until all coupling ring segments are assembled. Generally, each coupling ring segment will have a single bolt hole, so that only a single bolt need be removed at a time and the remaining bolts are easily capable of holding the gasket ring in the compressed stated. The bolts thus need only be sufficiently strong to be capable to draw the flanges together and compress the sealing means in the unloaded condition of the vessel, whereas after assemblage the coupling ring segments take up the load resulting from the operational pressure in the vessel and the bolts only serve to lock the ring segments against radial displacement and as an additional safety means for the coupling.

The novel flange coupling arrangement according to the present invention and the advantages of this arrangement will appear more fully from the following description and claims in conjunction with the accompanying drawings, which illustrate by way of example several embodiments of the invention. In the drawings:

FIGURE 1 shows in an axial section part of an embodiment of the flange coupling according to the invention for connecting two pipe sections;

FIGURE 2 is a cross-section on the line II—II of the coupling of FIGURE 1;

FIGURE 8 is a cross-section of an embodiment of the flange coupling according to the invention for mounting a cover on a pressure vessel.

Figure 3:
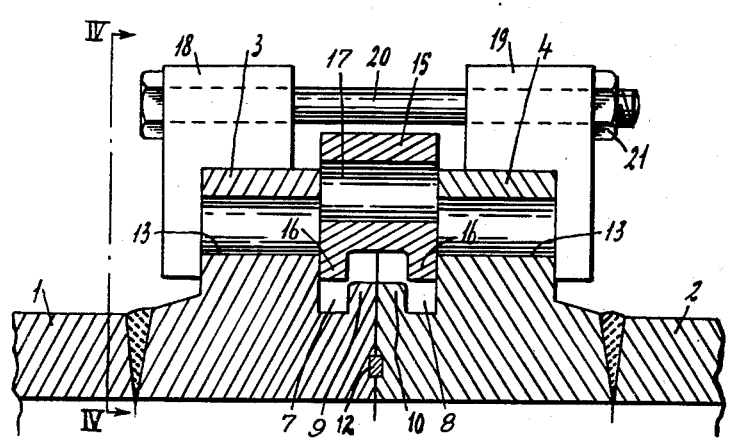
FIGURE 3 illustrates the manner of assembling the coupling ring segments for a flange coupling of the type as shown in FIGURES 1 and 2, the parts being shown in an axial section.

The flange coupling shown in the FIGURES 1 and 2 serves for the connection of two pipe sections 1 and 2 of a pipe line or the like, each section having a flange 3 or 4, respectively, welded thereto in the conventional manner. Each of the flanges 3 and 4 has an annular recess cut out therein bounded by a flat side wall 5 or 6, respectively, perpendicular to the axis of the pipe, which recess extends radially inwardly from the outer periphery of the flange to a point at some distance from the inner wall of the pipe, where the recess is bounded by a cylindrical bottom wall. The recess also opens onto the end face of the flange, the bottom wall extending through some distance from this end face axially inwardly. The cylindrical bottom wall of the recess is provided with an annular groove 7 or 8, respectively, of rectangular cross-section and situated adjacent the recess side wall 5 or 6, respectively, the latter side wall and the inner side wall of the groove thus lying in the same radial plane. The bottom wall of the recess thus forms adjacent the groove 7 or 8, respectively, an annular projecting edge portion 9, 10, respectively, of the flange. The two flanges and their recesses are exactly alike except that they are each other's mirror image. When, as shown in FIGURE 1, the two flanges are placed one against the other in aligned position, the two recesses enclosed between the recess side walls 5 and 6 form together a single annular cavity of substantially U-shaped cross-section opening in the peripheral surface of the flanges, the flanges abutting one against the other with the remaining portions 11 of their end faces. These end faces are provided with opposite ring grooves, in which a deformable annular gasket 12 has been arranged. The flanges 3 and 4 have coinciding axially extending bolt holes 13 arranged in a circular row co-axial with the pipe axis and opening into the cavity between the flanges. Screw bolts 14 extend through these aligned bolt holes and carry nuts 14'.

A split coupling ring comprising a plurality of ring segments 15 is arranged in the annular cavity enclosed between the recess side walls 5 and 6, which ring segments have at their inner side radially inwardly projecting edge portions 16. The ring segments 15 have a U-shaped cross-section similar to the cross-section of the cavity in such a way that, when the annular gasket 12 is sufficiently compressed between the end faces 11 of the two flanges, the projecting portions 16 of the coupling ring segments 15 may fittingly engage in the grooves 7 and 8, thereby enclosing the edge portions 11 and 12 of the flanges, the body portion of the ring segments closely fitting between the recess side walls 5 and 6 and completely filling up the cavity up to the periphery of the flanges. The coupling ring segments 15 are provided with bolt holes 17 coinciding with the bolt holes 13 in the flanges and through which the draw bolts 14 pass. In the embodiment of FIGURES 1 and 2 the ring segments 15 forming together a closed coupling ring each have a single bolt hole 17, there being eight bolt holes in a row and also eight ring segments. Although this embodiment is preferred, it is also possible to split the coupling ring into a smaller number of segments each extending through a greater angle and each having e.g. two bolt holes. However, generally at least three segments are necessary in order to allow for an easy assembly of the flange coupling as will be discussed herebelow.

The assemblage of the flange coupling of FIGURES 1 and 2 may be carried out as follows. First the two flanges to be connected are placed in alignment one against the other with the annular gasket 12 enclosed in the grooves in the abutting end faces 11, but without the coupling ring segments 15 in the cavity between the flanges. The bolts 14 are passed through the bolt holes 13 and the nuts 14' tightened to draw the end faces 11 of the flanges tightly against one another and to compress the annular gasket 12 sufficiently for obtaining the required tight seal against the high pressure, to which the pipe is to be subjected during its use. Next, one of the bolts 14 is removed and through the opening thus obtained a coupling ring segment 15 is radially inserted into the cavity between the two flanges and pressed home until its projecting edge portions 16 engage in the grooves 7 and 8 and thereby hold the edge portions 9 and 10 of the flanges clamped together (FIGURE 1). Then the removed bolt 14 is again passed through the aligned bolt holes 13 and 17, respectively, of the two flanges and the ring segment and the nuts 14' of this bolt are again tightened. In a similar way the other ring segments are subsequently one by one inserted into the cavity and locked against radial displacement by the bolts 14 passing therethrough. When all the ring segments 15 have thus been mounted they hold the flanges 3 and 4 clamped together with the gasket ring 12 in the compressed sealing condition. When the pipe segments 1 and 2 are subjected to a high operational pressure by fluid passing therethrough, the coupling ring segments take up the axial forces acting between the flanges, in which these ring segments are mainly subjected to shearing stresses. Since the ring segments engage the flanges at a relatively small radial distance from the inner wall of the pipe, i.e. inwardly of the bolt circle, the flanges are practically not subjected to any bending force. In the operating condition of the pipe of which the pipe sections 1 and 2 form a part, the bolts 14 are substantially relieved. These bolts only serve to compress the annular gasket 12 up to its flow point during assembling of the coupling and their number and diameter should be so chosen that after removal of a single bolt for the insertion of a coupling ring segment the remaining bolts can be take up the load for keeping the gasket in the compressed condition. After assemblage of the ring segments 15 the bolts only serve for locking these against radial movement and as an additional safety means. Since the bolts are not required to take up the operational load of the pipe, their number and diameter can be considerably smaller than would otherwise be the case and also the flanges may have correspondingly smaller dimensions.

Figure 4:
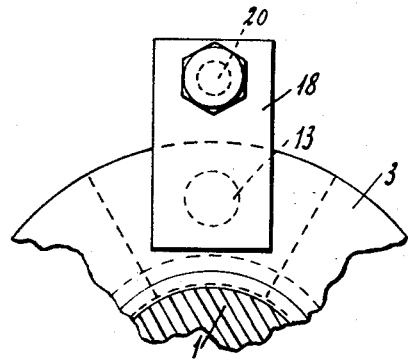
FIGURE 4 is partly an elevation and partly a section on the line IV—IV of the arrangement of FIGURE 3.
Figure 6:
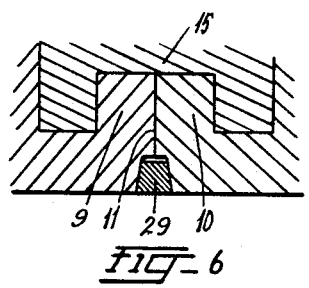
FIGURES 5, 6 and 7 show schematically three other sealing means for the flange coupling of FIGURE 1.

The number of bolts or their diameter can in some instances be further diminished, if an auxiliary clamping device as shown in FIGURES 3 and 4 is employed. This clamping device comprises two similar clamping jaws 18 and 19, which are hook-shaped and are adapted to engage the two flanges 3 and 4 in the manner shown. The jaw members 18 and 19 each have a bolt hole, through which a draw bolt 20 carrying a nut 21 passes. When the clamping device is arranged on the two flanges, the bolt 20 lies at a distance from the periphery of the flanges 3 and 4 which is sufficient for a coupling ring segment 15 to be able to lie in the cavity between the flanges in a position, in which its edge portions 16 do not yet engage in the grooves 7 and 8 (FIGURE 3).

In assembling the flange coupling with the aid of this clamping device, the two flanges 3 and 4 are again first drawn tightly against one another by means of the bolts 14 until the gasket ring 12 has been sufficiently compressed and without the coupling ring segments 15 being inserted into the cavity. Next, one of the bolts 14 is removed and a coupling ring segment 15 is inserted at this location into the cavity to a position as shown in FIGURE 3. Then the clamping device 18, 19 is mounted on the two flanges 3 and 4, the clamping jaws engaging the flanges at the location of the bolt holes of the removed bolt. By tightening the draw bolt 20 and nut 21 of the clamping device the latter can now exert a clamping force on the flanges instead of the removed bolt. As a consequence the coupling ring segment 15 situated below the clamping bolt 20 can now be completely pushed radially inwardly to its end position shown in FIGURE 1, after which the clamping device 18, 19 is removed and the removed bolt 14 and nuts 14' are again inserted and tightened. In a similar way the other coupling ring segments are thereupon mounted in the cavity. If desired, two or more clamping devices 18, 19 can be used.

Figure 5:
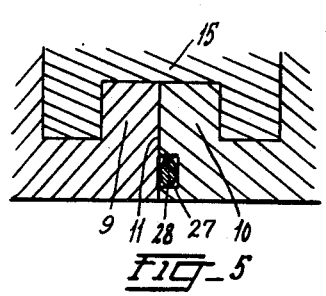
Figure 7:
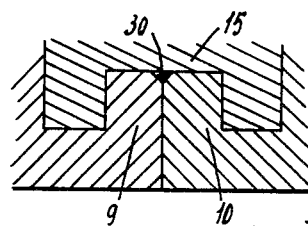

Obviously, the sealing means can be of another type than shown schematically in FIGURE 1 and e.g. comprise an O-ring 28 arranged in a ring groove 27 arranged in one of the two abutting flanges faces 11 (FIGURE 5) or comprise a so-called "lens" ring gasket 29 of trapezium-shaped cross-section (FIGURE 4) located in a groove of corresponding cross-section cut out in both abutting flange faces 11 and opening radially inwardly. In the latter case the gasket is sealingly pressed in its ring seat by the pressure in the pipe. It is also possible to connect the adjacent edges of the edge portions 9 and 10 along their circumference by a continuous sealing weld or butt joint 30 of V-section (FIGURE 7), which joint is of course not intended to take up any axial forces, but only serves as a seal. When the flange coupling has to be opened, this welding joint 30 must be cut away.

FIGURE 8 shows an embodiment of the flange coupling according to the invention for securing a cover or pipe plate against the end of a pressure vessel, which construction can e.g. be employed in heat exchangers, reactors and the like. The pressure vessel 22 is provided with a flange 23 having, in a similar way as above described in connection with FIGURES 1 and 2, a recess with side wall 5, groove 7 and radially projecting edge portion 9. A cover 24 is arranged against the flange 23 and has a similar recess with side wall 6, groove 8 and edge portion 10. In the annular cavity enclosed between the side walls 5 and 6 of the two recesses a number of coupling ring segments 15 are again arranged engaging with their inwardly projecting edge portions 16 in the grooves 6 and 8 and holding the flange and cover together in a position, in which the gasket ring 12 arranged between the abutting faces of cover and flange is held compressed. The flange 23 is in this case provided with a number of screw holes 25, in which bolts 26 are screwed passing through bolt holes in the coupling ring segments and in the flange portion of the cover and carrying nuts 26' at their outer ends. The flange coupling of FIGURE 8 can be assembled in a similar way as above described for the flange coupling of FIGURES 1 and 2.

Figure 9:
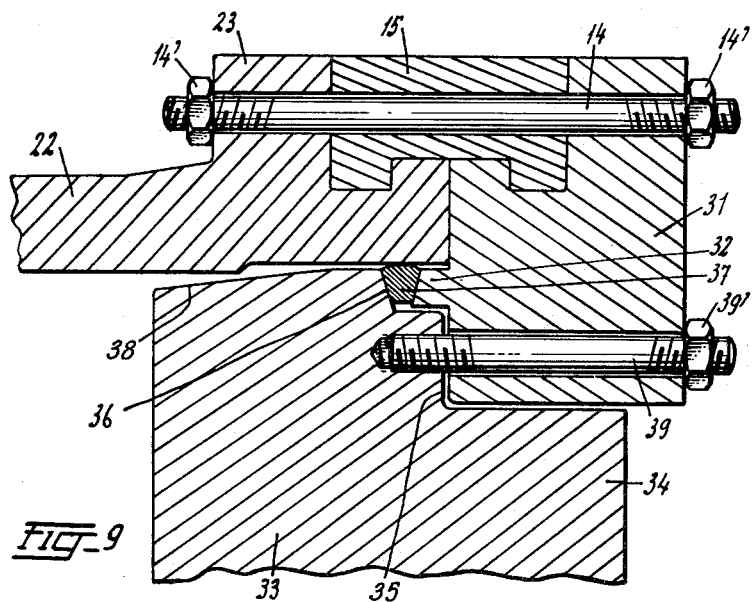
FIGURE 9 shows a similar cross-section as FIGURE 8 of another embodiment of the arrangement for mounting a cover on a pressure vessel.

FIGURE 9 shows a modification of the flange coupling arrangement of FIGURE 8 for securing a cover to a pressure vessel. A backing ring 31 is arranged against the flange 23 of the vessel 22 and, in the manner as above described, secured to this flange 23 by means of a closed ring of coupling segments 15 and locking bolts 14 with nuts 14'. The backing ring 31 extends radially inwardly past the inner wall of the opening of the pressure vessel 22 and is provided with an annular collar portion 32 projecting axially inwardly adjacent the inner wall of the vessel and having a tapering end face. The cover 33 has a jutting-out portion 34 fitting inside the backing ring 31, an annular shoulder portion 35 engaging behind the inwardly facing side of the backing ring 31, and a second tapering shoulder 36 outwardly and to the rear of the shoulder 35. An annular gasket 37 of trapezium-shaped section is arranged between the tapering face of the collar portion 32 and the second shoulder 36. The side wall of the cover tapers inwardly at 38 to obtain a clearance between this cover side wall and the inner wall of the vessel 22 so as to facilitate the removal of the cover. The backing ring 31 is provided with bolt holes for the passage of screw bolts 39 engaging in screw holes in the shoulder portion 35 of the cover 33 and carrying nuts 39' on their projecting threaded ends, which bolts and nuts serve to hold the backing ring 31 and cover 33 together during assemblage and for locking the cover in the required position after assemblage. The cover 33 is pressed axially outwardly by the pressure in the vessel 22 when the latter is in use, whereby the gasket ring 37 is compressed and sealingly engages the inner wall of the vessel 22. When the required rate of compression of the gasket ring 37 has been reached, the shoulder portion 35 of the cover abuts the backing ring 31 and thus prevents further compression of the gasket ring and an excessive flow of the latter in case of an exceptional high pressure in the vessel 22. During the small outward movement of the cover accompanying the compression of the gasket ring the bolts 39 are free to slide longitudinally in the bolt holes of the backing ring 31.

In assembling the cover, the backing ring 31 may be first secured to the flange 23 of the vessel 22 in a similar way as above described for the flange coupling of FIGURE 1. By giving the inner opening of the backing ring as well as the circumference of the cover an oval shape, the cover can be moved through the mounted backing ring into the vessel and, after the gasket ring 37 has been properly arranged against the collar portion 32, the cover 33 can be turned about its axis and properly located with respect to the backing ring 31 for the insertion of the bolts 39 to lock the cover in its place. It is, however, also possible to first loosely connect the cover 33 to the backing ring 31 by means of the bolts 39' with the gasket ring 37 arranged between the faces of the portions 32 and 36 without as yet being compressed, and then to insert the cover into the vessel opening and to secure the backing ring 31 to the vessel flange 23 by means of the coupling ring segments 15 in the described manner, whereupon the nuts 39' can be further tightened.

While the invention has been illustrated and described with reference to specific embodiments thereof, it will be understood that other embodiments may be resorted to without departing from the invention and within the scope of the following claims.

I claim:

1. In a flange coupling for connecting two abutting flanges of a high-pressure vessel, in which the flanges have coinciding bolt holes arranged in a circular row, draw bolts in said holes and engaging said flanges, and sealing means arranged between said vessel parts, said two flanges having adjoining faces respectively provided with an annular recess, each said recess being bounded by a side wall extending substantially radially inwardly from the outer periphery of the respective flange and by a substantially cylindrical bottom wall extending axially inwardly from the end face of said flange, said cylindrical bottom wall having an annular groove adjacent said radial side wall, the two recesses of said two flanges defining an annular circumferential cavity of substantially U-shaped cross-section, said bolt holes opening into said cavity and said annular sealing means being arranged radially inwardly of said cavity, a split coupling ring comprising a number of ring segments arranged in said cavity, said coupling ring segments each having a U-shaped cross-section corresponding to the sectional shape of said cavity, and each segment having a body portion closely fitting between said side walls of said two recesses and further having two radially inwardly projecting annular portions fittingly engaging in said two annular grooves, said coupling ring further having a number of bolt holes, at least one for each of said ring segments, coinciding with said bolt holes in said flanges and through which said draw bolts pass so as to lock the ring segments against radially outward displacement.

2. A coupling for securing a cover to a pressure vessel comprising a flange on said pressure vessel, a separate flange ring co-operating with and abutting said vessel flange, said flange ring extending radially inwardly past the inner wall of the vessel opening, said vessel flange and flange ring having a number of aligned bolt holes arranged in a circumferential row, said vessel flange and said flange ring each having an annular recess bounded by a side wall extending substantially radially inwardly from the outer periphery of the respective vessel flange and flange ring, and by a substantially cylindrical bottom wall extending axially inwardly from the end face of the respective vessel flange and flange ring, said cylindrical bottom wall having an annular groove adjacent said radial side wall, the two recesses of said vessel flange and flange ring, when the latter are arranged in abutting position together forming an annular circumferential cavity of substantially U-shaped cross-section, said bolt holes opening into said cavity, a split coupling ring comprising a number of ring segments arranged in said cavity, said coupling ring segments each having a U-shaped cross-section corresponding to the sectional shape of said cavity, and each segment having a body portion closely fitting between said side walls of said two recesses and further having two radially inwardly projecting annular portions fittingly engaging in said two annular grooves, said coupling ring further having a number of bolt holes, at least one for each of said ring segments, coinciding with said bolt holes in said flanges, a plurality of bolts extending through said aligned bolt holes in said vessel flange, said coupling ring segments and said flange ring, said bolts engaging said vessel flange and flange ring, a cover member having a greater surface area than the area of the opening of said flange ring, said cover member being arranged on the side of said flange ring facing inwardly into the vessel, means for holding said cover and flange ring together, annular sealing means arranged between the opposed faces of said cover and said flange ring and engaging the inner wall of said vessel.

3. A flange coupling for connecting two parts of a high-pressure vessel, comprising a flange on each of said parts, said two flanges being arranged in abutting position and having a plurality of aligned bolt holes arranged in a circumferential row, a plurality of bolts passing through said bolt holes and engaging said two flanges, said two flanges having adjoining faces respectively provided with an annular recess, each said recess being bounded by a side wall extending substantially radially inwardly from the outer periphery of the respective flange and by a substantially cylindrical bottom wall extending axially inwardly from the end face of said flange, said cylindrical bottom wall having an annular groove adjacent said radial side wall, the two recesses of said two flanges defining an annular circumferential cavity of substantially U-shaped cross-section, said bolt holes opening into said cavity, a split coupling ring comprising a number of ring segments arranged in said cavity, said coupling ring segments each having a U-shaped cross-section corresponding to the sectional shape of said cavity, and each segment having a body portion closely fitting between said side walls of said two recesses and further having two radially inwardly projecting annular portions fittingly engaging in said two annular grooves, said coupling ring further having a numberr of bolt holes, at least one for each of said ring segments, coinciding with said bolt holes in said flanges and through which said draw bolts pass so as to lock the ring segments against radially outward displacement, and annular sealing means arranged between the abutting end faces of said two flanges radially inwardly of said cavity, said coupling ring segments being so dimensioned that they hold said two flanges clamped together in a position, in which said sealing means is held sufficiently axially compressed for obtaining a tight seal between said two flanges.

References Cited by the Examiner
UNITED STATES PATENTS

| | | | |
|---|---|---|---|
| 869,106 | 10/07 | Schmidt | 285—364 |
| 1,514,803 | 11/24 | Souter | 285—364 |
| 2,329,938 | 9/43 | Oritz | 29—463 |
| 2,873,519 | 2/59 | Milne | 29—463 |

CARL W. TOMLIN, *Primary Examiner.*

THOMAS F. CALLAGHAN, *Examiner.*